Aug. 31, 1965
H. C. ROBERTS
3,203,494
POSITION INDICATING SYSTEM
Filed March 19, 1963
2 Sheets-Sheet 1
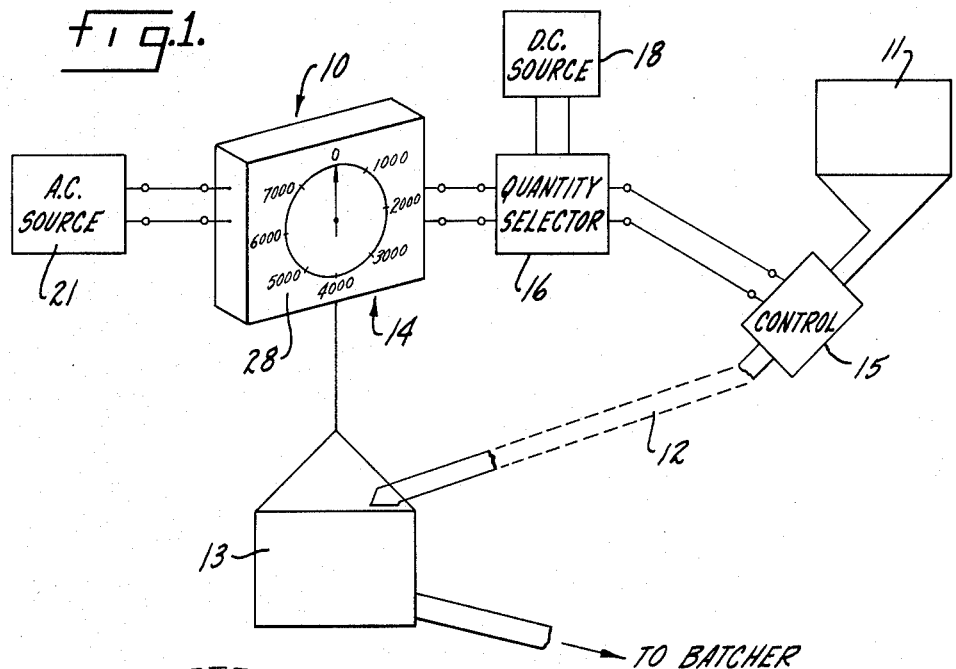
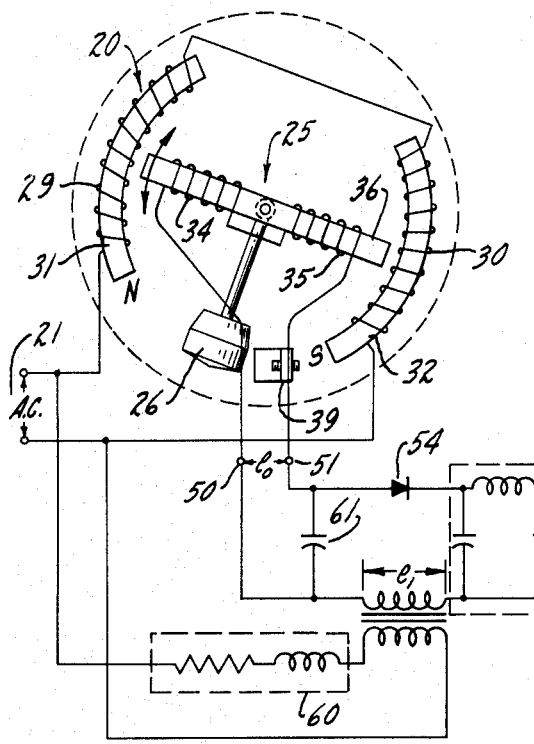
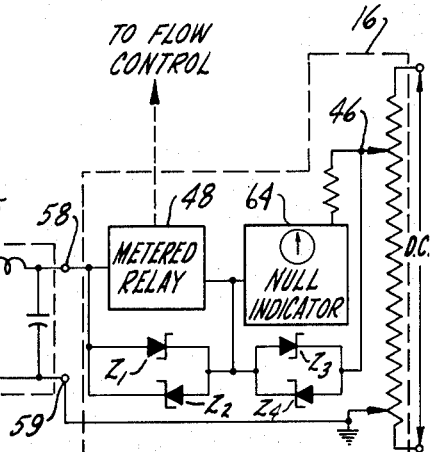
INVENTOR.
Howard C. Roberts,
BY Wolfe, Hubbard, Voit & Osann
Attorneys.

Aug. 31, 1965  H. C. ROBERTS  3,203,494
POSITION INDICATING SYSTEM
Filed March 19, 1963  2 Sheets-Sheet 2

INVENTOR.
Howard C. Roberts,
BY Wolfe, Hubbard, Voit & Osann
Attorneys.

United States Patent Office 3,203,494
Patented Aug. 31, 1965

3,203,494
POSITION INDICATING SYSTEM
Howard C. Roberts, Urbana, Ill., assignor to Koehring Company, Milwaukee, Wis., a corporation of Wisconsin
Filed Mar. 19, 1963, Ser. No. 266,380
2 Claims. (Cl. 177—1)

The present invention relates in general to indicating apparatus and methods and more particularly, to improved apparatus and methods for converting continuously changing displacements of a element sensing a variable physical parameter into a variable control signal, the latter being substantially linearly proportional to the magnitude of the change in displacement. In its principal aspects, the invention is concerned with inductive transducer apparatus and methods of utilizing such apparatus in producing an electrical control signal which is substantially linearly proportional to changes in, for example, the weight, volume, temperature, humidity, or other variable parameters which can be sensed in a body of material, such control signal then being utilized to limit the magnitude of the change in the variable parameter being measured.

It is a general aim of the present invention to provide improved methods and apparatus for generating a continuously variable signal which is substantially linearly proportional to changes in position of an element. While not so limited in its application, the invention will find especially advantageous use in batching operations such, for example, as concrete batching operations, wherein predetermined quantities of two or more ingredients must be intermingled with a high degree of accuracy to meet strict specifications. To this end, the invention provides novel methods and apparatus for effecting displacement of an element in proportion to changes in measured quantities of each of such ingredients and for converting such position changes into a variable control signal substantially linearly proportional to the measured quantities of the ingredients, the control signal being utilized to actuate suitable valving or the like for stopping the flow of the ingredients when a predetermined quantity thereof has been measured.

A related object of the invention is to provide improved inductive transducer apparatus characterized by its ability to produce larger output signals representative of a measured variable parameter than heretofore produced by conventional prior art transducers, for example, of the type commonly known as "differential transformers."

An ancillary object of the invention is to provide position indicating methods and apparatus which are characterized by their reliability in operation, and which produce not only larger output signals than those produced by conventional methods and apparatus, but which are considerably more accurate and also linear in their response.

It is a correlative object of the invention to provide a position-to-electrical signal transducer which, while characterized by its accuracy and reliability in operation, nevertheless, does not require critical manufacturing or assembling tolerances, thus simplifying asembly thereof and permitting of economic fabrication from readily available components.

Other objects and advantages of the invention will become apparent as the following description proceeds, taken in conjunction with the accompanying drawings in which:

FIGURE 1 is a diagrammatic block and line drawing illustrating that portion of the batching system for metering measured quantities of a single ingredient, the system here embodying the features of the present invention;

FIG. 2 is a schematic wiring diagram illustrating the circuit details of the exemplary apparatus shown in FIG. 1;

Figure 3:
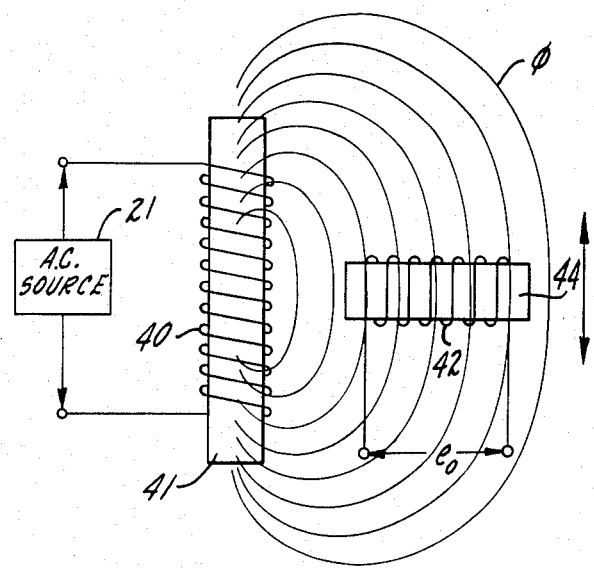
FIGS. 3 and 4 are schematic diagrams of modified forms of inductive transducers showing exemplary leakage flux fields, also embodying the features of the present invention.

While the invention is susceptible of various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the spirit and scope of the invention as expressed in the appended claims.

Referring now to the drawings, there is illustrated in FIG. 1 a block diagram depicting a portion of a concrete batching system 10 embodying the features of the present invention. The system 10 is here utilized for metering quantities of material, for example, aggregate, water or cement flowing from a bin 11 or other suitable supply source, along a flow path 12 to a weighing station 13, from which the material is then unloaded into a batcher (not shown). For sensing a variable physical parameter (e.g., the weight of the material at station 13), the exemplary system 10 includes a scale 14. In order to regulate and control the movement of material along the flow path 12, a control device 15 is provided which operates in response to signals from an adjustable quantity selector 16. The quantity selector 16 receives a control signal representative of the weight sensed by the scale 14, and compares that signal with a preset adjustable D.C. signal emanating from a source 18, the latter signal being manually selected by the operator to correspond to a desired quantity of the material being measured. Thus, when the two signals are equal or balanced, the quantity selector 16 passes a control signal to the device 15 for the purpose of operating the latter to terminate material flow.

In accordance with one of the important aspects of the present invention, there is provided a novel position indicating system employing a variable coupling transformer for the purpose of producing an output control signal which is substantially linearly proportional to the displacement of an element sensing a varying physical parameter, yet wherein the system does not require close manufacturing and assembly tolerances despite the fact that the control signal produced is characterized by its relatively high amplitude, accuracy and linearity. In the exemplary form of the invention, and as best shown with reference to FIG. 2, the variable coupling transformer takes the form of a transducer 19 having a first or primary winding 20 energized by an A.C. source 21, and a second or secondary winding 25 mounted for relative rotation with respect to the primary winding. One of the windings (in the exemplary case the secondary winding 25) is coupled to a parameter sensor, here shown as a pendulum 26 mounted in a scale head 28. The arrangement is such that the transducer produces an output signal which is responsive to and representative of a continuously varying quantity of materials detected at station 13. Of course, those skilled in the art will appreciate that the station 13 and scale 14 may take other forms for sensing physical parameters or conditions other than the weight of bodies of material, for example, temperature, pressure, flow rates, humidity and the like.

For the purpose of inductively coupling the primary and secondary windings in the illustrative embodiment of FIG. 2, a pair of leakage flux fields emanate from the primary winding 20, which here includes separate winding portions 29, 30 wound on individual cores 31, 32 respectively and connected in series for energization by the A.C. source 21. Disposed in the leakage flux fields is the secondary winding 25 which includes winding portions 34, 35 wound on a core 36, coupled to a pendulum 26 for rotation about a pivot 38 as the pendulum responds to variations in the sensed parameter (e.g., weight). As the pendulum responds to such variation, it is displaced from a reference position. There is a stop 39 provided to assure that pendulum 26 does not rotate too far in a counterclockwise direction.

In order to facilitate an understanding of the present invention, particularly with respect to the inductive coupling between the primary and secondary windings 20, 25, respectively, the ensuing discussion will first be directed to the simplified form of transducer shown in FIG. 3. As here illustrated, an exemplary flux field $\phi$ is established by a single primary winding 40 wound on a single axial core 41, the winding being energized by the A.C. source 21. A secondary winding 42 is wound on a single core 44 positioned in the flux field $\phi$ with freedom for relative movement in substantially linear directions parallel to the primary core 41, as contrasted to the rotary secondary core 36 shown in the exemplary embodiment of FIG. 2. The secondary core 44 is shown in FIG. 3 in the "null" position. That is, the flux lines $\phi$ are substantially parallel to the turns in the winding 42. Accordingly, there is zero coupling, or approximately zero coupling, between the primary and secondary windings 40, 42 respectively. In other words, the magnitude of the component of flux $\phi$ transverse to the windings 42 is substantially equal to zero.

As the secondary core 44 is moved linearly from the "null" position while being maintained substantially parallel to the primary core 41, the component of flux $\phi$ cutting windings 42 increases and a proportionally larger voltage $e_0$ is induced across the secondary. This is in accordance with Lenz's law as represented by the well known equation $$E = -n\frac{d\phi}{dt}$$

Indeed, the voltage output of the secondary varies substantially linearly with changes in the relative position between the primary and secondary windings 40, 42 respectively. In the present instance, the primary winding 40 is maintained stationary while the secondary winding 42 is displaced from its "null" position, although those skilled in the art will appreciate that the operation will be the same if the primary winding 40 is moved relative to a stationary secondary winding 42. The spacing between the primary and secondary windings is not critical. It is only necessary that the secondary be disposed in the flux field of the primary so that in the "null" position there is substantially zero coupling between the primary and secondary and, as the secondary is moved away from the "null" position, magnetic coupling takes place to effectuate a voltage output at the secondary winding terminals. Furthermore, though the illustrative embodiments show use of cores of magnetic material for the primary and secondary winding, the devices are operative if the cores are of air.

It has been found in practice that the transducer herein described provides an output signal at the secondary which is several times as large as have been heretofore obtained from typical prior art differential transformers. Merely by way of example, a primary 20 having windings 29, 30, each with 700 turns, and a 60 cycle electrical energizing source of 100 volts and .6 ampere, and with a secondary in which the coils 34, 35 are respectively 1,000 turns each, will produce, for a maximum movement of the secondary core on the order of 20 degrees, a secondary output voltage $e_0$ as large as 35 volts. Typical differential transformers common to the prior art generally produce signals of about 5 volts under the same set of conditions.

Turning now to the control circuit shown in FIG. 2 for controlling material flow, the quantity selector 16 includes an adjustable preset selector, which may conveniently take the form of a wiper arm 46 suitable for tapping selected portions of the voltage from the D.-C. source 18, and a comparator, here shown diagrammatically as a conventional metered relay 48. The latter serves to operate the control device 15 for regulating the flow of material to the station 13. The output voltage $e_0$ developed in the transducer secondary winding 25 appears across a pair of transducer output terminals 50, 51. To permit comparison of the transducer output signal with the preset D.-C. voltage, the transducer A.-C. output signal $e_0$ is first converted to a suitable D.-C. signal. To this end, the output signal $e_0$ is combined with an A.-C. biasing signal $E_1$, and then passed through a rectifier 54 and a filter 55. The output from the filter 55 is D.-C. signal which is presented to the input terminals 58, 59 of the quantity selector 16. The biasing signal $e_1$ facilitates operation and calibration by providing a D.-C. signal at the metered relay 48 even though no output signal is produced in the secondary winding 25 (i.e., when the windings 20, 25 are in the "null" position).

In order to adjust the phase of the biasing voltage $e_1$ to correspond with that of the transducer signal $e_0$, a phase shifter 60 is provided. To resonate the secondary winding 25, thereby increasing the output signal and eliminating certain undesirable harmonics therefrom, a tuning capacitor 61 is connected across the secondary 25. For indicating when the biased and filtered D.-C. signal from the transducer 19 and the D.-C. signal from the preset selector are equal or balanced, a null indicator 64 is provided. A pair of back-to-back zener diodes $Z_1$, $Z_2$ are connected across the relay 48 and a second pair of back-to-back zener diodes $Z_3$, $Z_4$ are connected across the null indicator 64, the two pairs of diodes servicing to protect the metered relay 48 and the null indicator 64 by insuring that the voltages thereacross do not exceed a maximum value. A zero adjustment 65 is also provided for calibrating the quantity selector 16.

During a batching operation when the operator desires to control the flow of one of the materials used, it is simply necessary to manually select the quantity of the specific material, aggregate, water, or cement, to be measured at the station 13. This is done by adjusting the position of the wiper 46 so as to provide a D.-C. signal at the metered relay 48. The selected D.-C. signal corresponds to the D.-C. signal which the transducer 19 would provided at terminals 58, 59 when the desired quantity of material is present at station 13. As material flows through the control device 15 to the station 13, the pendulum 26 of scale 14 is actuated. More particularly, the pendulum 26 moves proportionally as the quantity of material at the station 13 continuously increases. An output signal $e_0$ is produced as the pendulum 26 carries with it the secondary core 36, thus causing the winding 25 to cut the flux field $\phi$. The signal $e_0$ is biased, rectified and applied to metered relay 48. As long as the preset D.-C. signal is larger than the D.-C. signal from the transducer 19, the control device 15 will not restrict flow of material to the station 13. However, when the quantity of material sensed at the station 13 by the scale 14 moves the pendulum 26 sufficiently to effectuate an output signal $e_0$ from secondary winding 25 which, when biased and filtered, equals the preset D.-C. signal, the metered relay 48 will operate the control device 15 to terminate material flow.

Figure 4:
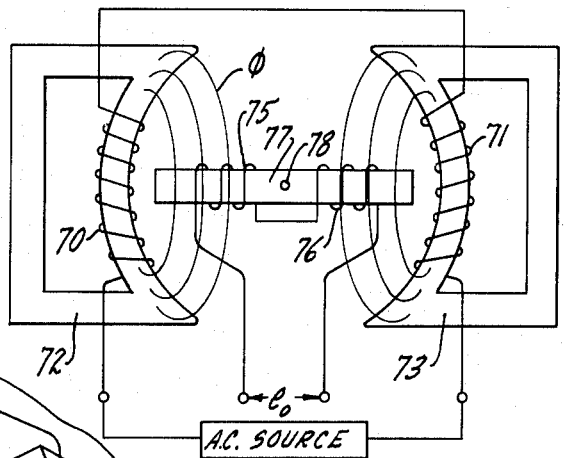

Referring now to FIG. 4, it will be observed that a pair of primary windings 70, 71 are wound on respective closed loop cores 72, 73. The primary windings 70, 71 are connected in series and energized by an A.-C. source 21 to provide a flux. A major portion of the flux threading through the windings 70, 71 will follow a path through the cores 72, 73 respectively since this is the path of least reluctance. There will, however, be a small portion of the flux $\phi$ which will follow a leakage path through the air. For coupling with the leakage flux, a secondary having windings 75, 76 wound on a core 77 is disposed in the leakage flux field $\phi$ and mounted on a pivot 78 for relative movement with respect to the primary windings. As the secondary is moved from the null position, magnetic coupling will take place between the primary and secondary windings and there will be a transfer of energy from the primary to the secondary therethrough. Because the leakage flux is relatively small, only a small part of the energy from the primary cores 72, 73 will be transferred to the secondary windings 75, 76. Accordingly, movement of the secondary will have substantially no effect on the phase in the primary. Thus, the leakage flux is maintained substantially constant with movement of the secondary core, and the voltage output of the secondary increases linearly with displacement of the secondary winding from its "null" position.

Figure 5:
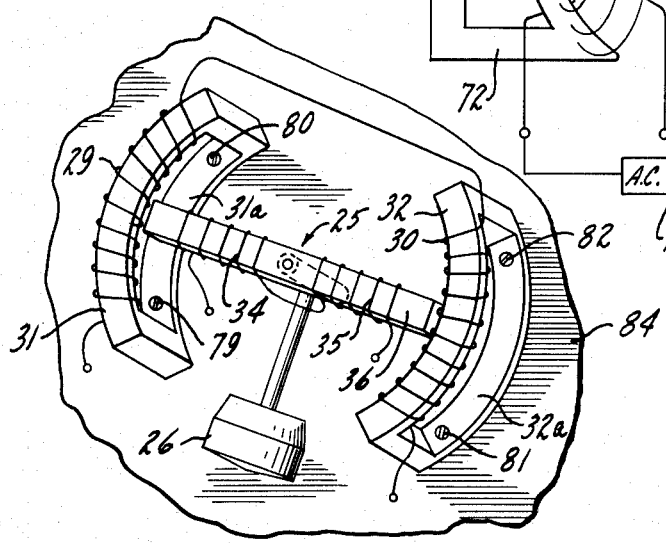
FIG. 5 is a rear elevational view here illustrating the position-to-voltage transducer shown in FIG. 4 as mounted on a scale used for weighing the ingredients being measured.

For permitting movement of the sensing element or pendulum 26 to effectuate production of an output signal $e_0$ from the secondary winding 25, as shown in the exemplary embodiment of FIG. 5, the primary cores 30, 31 of FIG. 2 can be of closed loop construction having rear portions 30a, 31a, respectively for mounting on scale head member 84. In the present instance, the respective core rear portions 31a, 32a are attached by appropriate fastening means, for example, screws 79, 80 and 81, 82 respectively. Accordingly, the structure as illustrated in FIG. 5 allows for efficient use of the space within the scale head 28 and also improves the accuracy of the transducer 19 as there is no necessity for linkages between the sensing element 26 and movable secondary core 36.

It will be appreciated from the foregoing that the present invention provides a novel position indicating system which is particularly suitable for use in metering measured amounts of different ingredients used in batching operations. The arrangement is such that it permits of control by an operator at points remote from the batching equipment. In view of the fact that the apparatus does not require critical manufacturing tolerances, requirements that are present with most differential transformers, the apparatus is quite economical, both in terms of initial cost and manufacturing procedures. Moreover, the use of closed magnetic cores enables large amounts of reactive energy to be "stored" in the primary. Since the apparatus operates on a small portion of the total flux in the primary, the leakage portion, and since large amounts of reactive energy are stored therein, the small amounts of energy drained from the primary by movement of the secondary from a "null" position do not introduce significant errors into the system. Thus, the system is characterized by its accurate and substantially linear response.

I claim as my invention:

1. In a system for controlling material movement from a source to a measuring station having a selector with an adjustable D.-C. signal output corresponding to a predetermined quantity of material movement, the combination comprising, a comparator for receiving and comparing the selected D.-C. signal with a variable D.-C. signal, a controller responsive to said comparator for regulating movement of the material, a sensing element continuously varying from a reference position in response to continuous movement of material to the measuring station, an A.-C. signal source, and an inductive transducer energized by said A.-C. signal and coupled to said sensing element for effectuating said D.-C. signal at said comparator which varies substantially linearly with displacement of said sensing element from its reference position, said inductive transducer including, a primary winding energized by said A.-C. source to produce a leakage flux field, and a secondary winding, means for coupling one of said windings for movement with said sensing element and the other of said windings being maintained stationary, said secondary winding having a null position when said movable element is at said reference position and a linearly proportional output signal as said secondary winding is relatively moved from said null position, and means for rectifying said secondary winding output signal, said controller terminating material movement in response to said comparator sensing that the selector signal and the transducer signals are substantially equal.

2. The method of controlling flow of material to a station by the use of a variable coupling magnetic transformer including a primary winding energized by an electrical signal source to produce a flux field and a secondary winding having a reference position relative to said primary winding in which there exists a zero magnetic coupling between said windings, one of said windings being coupled to a movable element for simultaneous movement therewith, and a source of an adjustable control signal, said method comprising the steps of producing a variable output signal substantially proportional to changes in the quantity of material at said station by changing the position of said movable element in proportion to said changes in the quantity of material at said station so that said one winding is moved relative to the other winding from said reference position, producing a second signal corresponding to a desired quantity of the material being measured, electrically comparing said output signal and said second signal and producing a control signal in response to the balancing of the two compared signals, and applying said control signal to a controller for terminating the flow of material to said station.

References Cited by the Examiner

UNITED STATES PATENTS

| | | | |
|---|---|---|---|
| 2,447,212 | 8/48 | Schoeppel | 336—118 |
| 2,507,763 | 5/50 | Caine | 336—119 |
| 2,669,678 | 2/54 | Pfuntner | 340—198 X |
| 2,885,198 | 5/59 | Roessler | 177—210 |
| 2,938,701 | 5/60 | Thorsson et al. | 177—70 |
| 2,974,269 | 3/61 | Cooper | 323—9 |
| 3,112,805 | 12/63 | Williams | 177—210 X |

LEO SMILOW, *Primary Examiner.*